(12) United States Patent
Kim (10) Patent No.: US 9,250,732 B2
(45) Date of Patent: Feb. 2, 2016

(54) DISPLAY APPARATUS AND METHOD FOR CONTROLLING THE SAME

(71) Applicant: SAMSUNG ELECTRONICS CO., LTD., Suwon-si (JP)

(72) Inventor: Jung-dae Kim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 32 days.

(21) Appl. No.: 14/313,342

(22) Filed: Jun. 24, 2014

(65) Prior Publication Data

US 2014/0375583 A1 Dec. 25, 2014

(30) Foreign Application Priority Data

Jun. 24, 2013 (KR) .................. 10-2013-0072526

(51) Int. Cl.
*G06F 3/041* (2006.01)

(52) U.S. Cl.
CPC ...... *G06F 3/041* (2013.01); *G06F 2203/04806* (2013.01)

(58) Field of Classification Search
CPC ... G06F 3/041; G06F 3/0416; G06F 3/04845; G06F 3/0488
See application file for complete search history.

(56) References Cited

U.S. PATENT DOCUMENTS

| | | | | |
|---|---|---|---|---|
| 7,430,008 | B2* | 9/2008 | Ambiru | H04N 5/23293 348/333.01 |
| 2009/0098912 | A1* | 4/2009 | Kim | G06F 3/0481 455/566 |
| 2009/0228820 | A1* | 9/2009 | Kim | G06F 3/04817 715/769 |
| 2009/0237421 | A1* | 9/2009 | Kim | G06F 3/0485 345/661 |
| 2010/0005390 | A1* | 1/2010 | Bong | G06F 3/0414 715/702 |
| 2010/0058254 | A1* | 3/2010 | Narita | G06F 3/0481 715/863 |
| 2010/0173678 | A1* | 7/2010 | Kim | H04N 5/23216 455/566 |
| 2010/0321312 | A1* | 12/2010 | Han | G06F 1/1694 345/173 |
| 2011/0122077 | A1* | 5/2011 | Choi | G06F 3/0481 345/173 |
| 2011/0157046 | A1* | 6/2011 | Lee | G06F 1/169 345/173 |
| 2011/0267291 | A1* | 11/2011 | Choi | G06F 1/1692 345/173 |
| 2012/0184335 | A1* | 7/2012 | Kim | G06F 3/04883 455/566 |
| 2012/0229377 | A1* | 9/2012 | Kim | G06F 3/017 345/157 |
| 2012/0262574 | A1* | 10/2012 | Park | G06F 3/017 348/143 |
| 2013/0002576 | A1* | 1/2013 | Kim | G06F 3/017 345/173 |

(Continued)

FOREIGN PATENT DOCUMENTS

| | | |
|---|---|---|
| JP | 2006-271841 A | 10/2006 |
| KR | 10-2009-0102727 A | 9/2009 |
| KR | 10-2011-0066266 A | 6/2011 |

*Primary Examiner* — Joe H Cheng
(74) *Attorney, Agent, or Firm* — Sughrue Mion, PLLC (57) ABSTRACT

A display apparatus and a method for controlling the same are provided. The method for controlling a display apparatus includes sensing a first touch input on a display screen; determining a first pattern based on the sensed first touch input; determining a second pattern based on a second touch input if the second touch input is sensed in a predetermined threshold time after the first pattern is determined; performing a zoom in or a zoom out of content that is displayed on the display screen based on the first and second patterns; and displaying the content that is zoomed in or zoomed out according to the performing.

20 Claims, 8 Drawing Sheets

(56) References Cited

U.S. PATENT DOCUMENTS

| | | | |
|---|---|---|---|
| 2013/0083079 A1* | 4/2013 | Paushkina | G06F 3/0488 345/668 |
| 2013/0150158 A1* | 6/2013 | Kang | A63F 13/00 463/31 |
| 2013/0194217 A1* | 8/2013 | Lee | G06F 3/041 345/173 |
| 2013/0236093 A1* | 9/2013 | Gatt | G06F 3/0484 382/167 |
| 2013/0265246 A1* | 10/2013 | Tae | G06F 3/041 345/173 |
| 2013/0321340 A1* | 12/2013 | Seo | G06F 1/1641 345/174 |
| 2014/0059501 A1* | 2/2014 | Yuu | G06F 3/017 715/863 |
| 2014/0211047 A1* | 7/2014 | Lee | H04N 5/23296 348/240.99 |
| 2014/0333567 A1* | 11/2014 | Mukai | G06F 3/04883 345/173 |

* cited by examiner

DISPLAY APPARATUS AND METHOD FOR CONTROLLING THE SAME

PRIORITY

This application claims priority under 35 U.S.C. §119(a) from Korean Patent Application No. 10-2013-0072526, filed on Jun. 24, 2013, in the Korean Intellectual Property Office, the disclosure of which is incorporated herein by reference.

BACKGROUND

1. Field

Exemplary embodiments relate to a display apparatus and a method for controlling the same, and more particularly to a display apparatus and a method for controlling the same, which can zoom in and zoom out of content.

2. Description of the Related Art

In order to enlarge or reduce content that is displayed on a touch screen of a display device, a user may put two fingers on the touch screen on which the content is displayed and enlarge or reduce the corresponding content using the two fingers.

However, in such a method for enlarging or reducing content, a user is required to touch the touch screen with two fingers. Thus, the method can be implemented only on a touch screen with multi-touch detection capability, but cannot be performed on a touch screen without multi-touch detection capability.

In addition, the method described above causes hand marks, such as fingerprints, to remain on the touch screen, and foreign substances to stick to the touch screen since the user must put his/her fingers directly on the touch screen. Due to this, the touch sensing function of the touch screen for sensing the user's touch may deteriorate.

Further, in the case of controlling the touch screen using a touch pen, various functions of the display device can be controlled through the touch pen, but controlling the enlargement and reduction of the content through the touch pen is not possible using the above described method.

SUMMARY

Exemplary embodiments address at least the above needs and may provide at least the advantages described below. According to an aspect of an exemplary embodiment, it possible to perform a zoom in/out function intuitively and dynamically through a touch screen.

According to one aspect of an exemplary embodiment, a method for controlling a display apparatus includes sensing a first touch input on a display screen; determining a first pattern based on the sensed first touch input; if a touch input is sensed in a predetermined threshold time after the first pattern is determined, determining a second pattern based on a second touch if the second touch input is sensed in a predetermined threshold time after the first pattern is determined; performing a zoom in or a zoom out of content that is displayed on the display screen based on the first and second patterns; and displaying the content that is zoomed in or zoomed out according to the performing.

The performing of zoom in or zoom out may include comparing a size of the first pattern and a size of the second pattern with each other based on a number of points constituting the first pattern and a number of points constituting the second pattern, and performing the zoom in or the zoom out of the content that is displayed on the display screen in accordance with a result of the comparison.

The performing of zoom in or zoom out may include performing the zoom in of the content that is displayed on the display screen if the size of the second pattern is larger than the size of the first pattern; and performing the zoom out of the content that is displayed on the display screen if the size of the second pattern is smaller than the size of the first pattern.

The performing of zoom in or zoom out may include performing the zoom in or zoom out of the content in stages in accordance with a ratio of the number of points constituting the first pattern to the number of points constituting the second pattern.

The performing of the zoom in or the zoom out comprises moving a content area that belongs to the first pattern to a center area of the display screen if the zoom in of the content is performed.

The method according to an exemplary embodiment may further include determining whether a third touch input related to a third pattern that is in a form of a straight line is consecutively sensed after the second touch input is performed, wherein the performing of the zoom in or the zoom out includes differently performing the zoom in or the zoom out of the content that is displayed on the display screen based on a direction of the third pattern.

The performing of zoom in or zoom out may include performing the zoom in of the content that is displayed on the display screen if the direction of the third pattern is directed to an outside direction of the second pattern and performing the zoom out of the content that is displayed on the display screen if the direction of the third pattern is directed to an inside direction of the second pattern.

The performing of zoom in or zoom out may include if the zoom in of the content is performed in accordance with the direction of the third pattern, moving a content area that belongs to the first pattern to a direction that corresponds to the direction of the third pattern.

The first and second patterns may be patterns in a figure shape, and the method may further include determining whether the first and second patterns are patterns in the same figure shape.

According to an aspect of another exemplary embodiment, a display apparatus includes a display configured to display content; a sensor configured to sense a touch input on a display screen; and a controller configured to determine a first pattern based on a first sensed touch input, to determine a second pattern based on a second touch input if the second touch input is sensed in a predetermined threshold time after the first pattern is determined, to control the display to perform a zoom in or a zoom out of the content based on the first and second patterns, and to display the content that is zoomed in or zoomed out based on the first and second patterns.

The controller may compare a size of the first pattern and a size of the second pattern with each other based on a number of points constituting the first pattern and a number of points constituting the second pattern, and perform the zoom in or the zoom out of the content that is displayed on the display screen in accordance with a result of the comparison.

The controller may perform the zoom in of the content that is displayed on the display screen if the size of the second pattern is larger than the size of the first pattern, and perform the zoom out of the content that is displayed on the display screen if the size of the second pattern is smaller than the size of the first pattern.

The controller may perform the zoom in or zoom out of the content in stages in accordance with a ratio of the number of points constituting the first pattern to the number of points constituting the second pattern.

The controller may move a content area that belongs to the first pattern to a center area of the display screen if the zoom in of the content is performed.

The controller may differently perform the zoom in or the zoom out of the content that is displayed on the display screen based on a direction of a third pattern if a third touch input related to the third pattern that is in a form of a straight line is consecutively sensed after the second touch input is performed.

The controller may perform the zoom in of the content that is displayed on the display screen if the direction of the third pattern is directed to an outside direction of the second pattern, and perform the zoom out of the content that is displayed on the display screen if the direction of the third pattern is directed to an inside direction of the second pattern.

The controller may move a content area that belongs to the first pattern to a direction that corresponds to the direction of the third pattern if the zoom in of the content is performed in accordance with the direction of the third pattern.

The first and second patterns may be patterns in a figure shape, and the controller may determine whether to perform the zoom in or the zoom out based on whether the first and second patterns are patterns in the same figure shape.

As described above, according to various exemplary embodiments the display apparatus performs the zoom in and the zoom out using not only the user's finger but also the touch pen, and thus various intuitive UIs can be provided.

BRIEF DESCRIPTION OF THE DRAWINGS

The above and other aspects, features and advantages of exemplary embodiment will be more apparent from the following detailed description when taken in conjunction with the accompanying drawings, in which.

DETAILED DESCRIPTION OF EMBODIMENTS OF EXEMPLARY EMBODIMENTS

Hereinafter, exemplary embodiments are described in detail with reference to the accompanying drawings.

Figure 1:
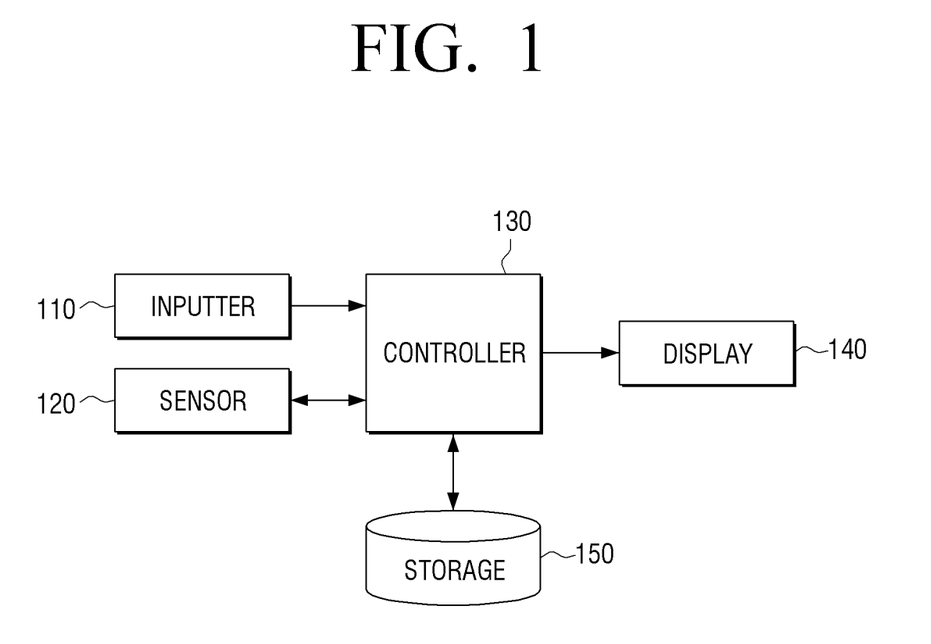
FIG. 1 is a block diagram of a display apparatus according to an exemplary embodiment.

FIG. 1 is a block diagram of a display apparatus according to an exemplary embodiment.

As illustrated in FIG. 1, a display apparatus 100 includes an inputter 110, a sensor 120, a controller 130, a display 140, and a storage 150.

The inputter 110 is an input means for receiving and transferring various user commands to the controller 130, and may be implemented by an input panel. Here, the input panel may include a touch pad, a key pad having various kinds of function keys, numeral keys, special keys, and character keys, or a touch screen. The sensor 120 senses a touch input on a display screen through the inputter 110.

The controller 130 determines a first pattern based on a touch input sensed through the sensor 120. Thereafter, the controller 130 determines whether a touch input is sensed in a predetermined threshold time through the sensor 120. If the touch input is sensed in the predetermined threshold time after the first pattern is determined as the result of the determination, the controller 130 determines a second pattern based on the sensed touch input. Thereafter, the controller 130 performs a zoom in or a zoom out of content that is displayed on the display screen based on the predetermined first and second patterns.

Accordingly, the display 140 can display the content zoomed in or zoomed out on the screen. The display 140, which displays the content zoomed in or zoomed out as described above, may be implemented by a liquid crystal display (LCD), an organic light emitting display (OLED), or a plasma display panel (PDP). Further, the display 140 may be implemented in the form of a touch screen that forms a mutual layer structure with a touch pad, and such a touch screen may be configured to detect a touch input position, a touch input area, and even a touch input pressure.

On the other hand, the controller 130, which performed zoom in or zoom out of the content that is displayed on the display screen based on the first and second patterns as described above, may perform the zoom in or zoom out of the corresponding content through comparison of the sizes of the first and second patterns with each other.

In one exemplary embodiment, the controller 130 may compare the sizes of the first pattern and the second pattern with each other based on the number of points constituting the first pattern and the number of points constituting the second pattern. Here, the first and second patterns may be in a figure shape, such as a circle, a rectangle, or a triangle, and the respective points that constitute the first and second patterns in the figure shape may be coordinate values of areas on which the touch input is consecutively performed in relation to the first and second patterns. If the size of the second pattern is larger than the size of the first pattern as the result of the comparison, the controller performs the zoom in of the content that is displayed on the display screen, and if the size of the second pattern is smaller than the size of the first pattern, the controller performs the zoom out of the content that is displayed on the display screen. That is, if the number of points constituting the second pattern is larger than the number of points constituting the first pattern, the controller 130 determines that the second pattern is larger than the first pattern, and performs a zoom in of the content that is displayed on the display screen. By contrast, if the number of points constituting the second pattern is smaller than the number of points constituting the first pattern, the controller 130 determines that the second pattern is smaller than the first pattern, and performs a zoom out of the content that is displayed on the display screen.

In another exemplary embodiment, if the first and second patterns are patterns in the circular shape, the controller 130 may compare the sizes of the first and second patterns through comparison of the diameters of the first and second patterns in the circular shape.

Specifically, if the first pattern is determined to be entered, the controller 130 acquires a coordinate value of a point that corresponds to the point onto which an initial touch is input among the respective points constituting the first pattern (hereinafter referred to as a "first coordinate value"). Thereafter, the controller 130 acquires a coordinate value of a point that corresponds to the farthest point based on the first coordinate value (hereinafter referred to as a "second coordinate value"). As described above, if the first and second coordinate values for the first pattern are acquired, the controller 130 may acquire the diameter of the first pattern based on the first and second coordinate values. Further, the controller 130 may acquire the diameter of the second pattern using the same method. If the diameters of the first and second patterns are acquired, the controller 130 compares the diameters of the first and second patterns with each other. If the diameter of the second pattern is larger than the diameter of the first pattern as the result of the comparison, the controller 130 performs a zoom in of the content that is displayed on the display screen. By contrast, if the diameter of the second pattern is smaller than the diameter of the first pattern, the controller 130 performs a zoom out of the content that is displayed on the display screen.

In another exemplary embodiment, if the first pattern is determined to be entered, the controller 130 may provide guide information for performing the zoom in or zoom out. Specifically, if the first pattern is determined to be entered, the display 140 displays the first pattern that is determined based on the user's touch input. Thereafter, the display 140 displays guide patterns on an outside and an inside of the first pattern that is displayed on the display screen in accordance with a guide information providing command of the controller 130. If a touch input is sensed in a predetermined threshold time in a state where the guide pattern is displayed, the controller 130 determines the second pattern based on the sensed touch input. Thereafter, the controller 130 determines whether the second pattern is positioned on an area that is related to one of the outside and inside guide patterns. If it is determined that the second pattern is positioned on the area which is related to the guide pattern that is displayed on the outside of the first pattern as the result of the determination, the controller 130 may perform the zoom in of the content that is displayed on the display screen. On the other hand, if it is determined that the second pattern is positioned on the area which is related to the guide pattern that is displayed on the inside of the first pattern, the controller 130 may perform the zoom out of the content that is displayed on the display screen.

On the other hand, according to an exemplary embodiment, the controller 130 may perform the zoom in or zoom out of the content that is displayed on the display screen in stages in accordance with a ratio of the number of points constituting the first pattern to the number of points constituting the second pattern. If the zoom in or zoom out of the content that is displayed on the display screen is performed in stages in accordance with the ratio of the numbers of points constituting the first and second patterns, respectively, the first and second patterns may be in a figure shape, such as a circle, a rectangle, or a triangle.

Specifically, the storage 150 may store set values for performing the zoom in or zoom out in stages in accordance with the ratio of the numbers of points constituting the first and second patterns, respectively. For example, if the ratio of the numbers of points constituting the first and second patterns is in the range of 1:1 to 1:1.4, the storage 150 may store the set values for performing the zoom in at a first stage, while if the ratio of the numbers of points is in the range of 1:1.4 to 1:1.9, the storage 150 may store the set values for performing the zoom in at a second stage. If the ratio of the numbers of points is higher than 1:2, the storage 150 may store the set values for performing the zoom in at a third stage. Further, if the ratio of the numbers of points constituting the first and second patterns is in the range of 1:0.7 to 1:0.9, the storage 150 may store the set values for performing the zoom out at the first stage, while if the ratio of the numbers of points is in the range of 1:0.5 to 1:0.6, the storage 150 may store the set values for performing the zoom out at the second stage. If the ratio of the numbers of points is lower than 1:0.4, the storage 150 may store the set values for performing the zoom out at the third stage.

Accordingly, if the ratio of the zoom in/out is determined based on the numbers of points constituting the first and second patterns, the controller 130 acquires the set values for performing the zoom in or zoom out from the storage 150 in accordance with the determined ratio. Thereafter, the controller 130 may perform the zoom in or zoom out of the content that is displayed on the display screen in stages based on the acquired set values.

However, the present disclosure is not limited thereto. As in the above-described exemplary embodiment, if the first and second patterns are patterns in the circular shape, the controller 130 may determine the ratio from the respective diameters pre-acquired from the first and second patterns, and perform the zoom in or zoom out of the content that is displayed on the display screen in stages based on the set values related to the determined ratio.

On the other hand, according to an exemplary embodiment, when performing the zoom in of the content that is displayed on the display screen, the controller 130 may control the display 140 to move a content area that belongs to the first pattern to a center area of the display screen to display the content area.

For example, if it is sensed that the touch input for the first pattern having a size that is smaller than the size of the second pattern is performed at an upper left end of the display screen, the controller 130 performs the zoom in of the displayed content. At this time, the controller 130 controls the display 140 to display the content area, which is displayed at the upper left end of the display screen before the zoom in is performed, in the center area of the display screen. Accordingly, the display 140 moves and displays the content zoomed in, and thus the content area, which is displayed at the upper left end of the display screen before the zoom in is performed, may be displayed in the center of the screen.

On the other hand, the controller 130 may compare the sizes of the first pattern and the second pattern, and if the second pattern is determined before the zoom in or zoom out of the corresponding content is performed, the controller 130 may determine whether the first and second patterns are patterns in the same figure shape. For example, if the first pattern is determined as a pattern of a circular shape and the second pattern is determined as a pattern of a rectangular shape, the controller 130 determines that the first and second patterns are not the patterns having the same figure shape. Accordingly, the controller 130 does not perform the zoom in or zoom out of the content that is displayed on the display screen based on the first and second patterns. On the other hand, if it is determined that the first and second patterns are the patterns having the same figure shape, the controller 130 may compare the sizes of the first and second patterns with each other based on the above-described embodiment, and perform the zoom in or zoom out of the content that is displayed on the display screen based on the result of the comparison.

However, the present disclosure is not limited thereto, and the controller 130 may perform the zoom in or zoom out of the content that is displayed on the display screen based on the pre-stored pattern information. For this, the storage 130 may store pattern information of a figure shape for performing an operation related to the zoom in/out. In this case, if the first and second patterns are determined, the controller 130 determines whether the first and second patterns are suitable for the pre-stored pattern information of the figure shape for performing the operation related to the zoom in/out. If the first and second patterns are suitable for the pre-stored pattern information as the result of the determination, the controller 130 compares the sizes of the first and second patterns with each other based on the above-described embodiment, and performs the zoom in or zoom out of the content that is displayed on the display screen based on the result of the comparison. If the first and second patterns are not suitable for the pre-stored pattern information, the controller 130 does not perform the zoom in or zoom out of the corresponding content.

Hereinafter, referring to FIGS. 2 to 4, the operation of performing zoom in or zoom out of the content that is displayed on the screen based on the first and second patterns will be described in detail.

Figure 2:
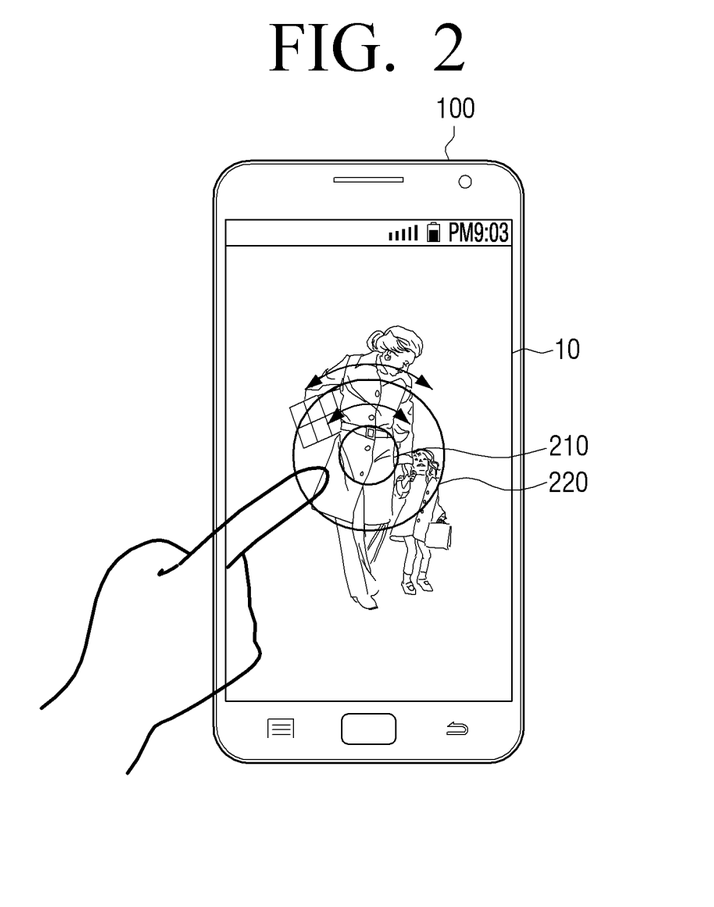
FIG. 2 is an exemplary view of a display apparatus that receives a touch input for zooming in or zooming out according to an exemplary embodiment.

FIG. 2 is an exemplary view of a display apparatus that receives an input of a touch for zoom in or zoom out according to an exemplary embodiment.

As illustrate in FIG. 2, an image 10 may be displayed on the screen of the display apparatus 100. In a state where such an image 10 is displayed, a user may consecutively perform a touch having a circular shape pattern using his/her finger or a touch pen. That is, the user may perform a touch that indicates the first pattern 210 of a circular shape, and then perform a touch that indicates the second pattern 220 of a circular shape within a predetermined threshold time. At this time, in performing the touch that indicates the first and second patterns 210 and 220, the user may select a touch movement direction as a left or right movement direction.

If the second pattern 220 is determined according to user's another touch input within the predetermined threshold time after the first pattern 210 is determined according to the user's touch input, the display apparatus 100 determines whether the first pattern 210 and the second pattern 220 are the patterns having the same figure shape. As illustrated, if it is determined that the first pattern 210 and the second pattern 220 are the patterns of the circular shape, the display apparatus 100 may perform the zoom in or zoom out of the image 10 based on the first and second patterns 210 and 220.

Hereinafter, the operation of performing the zoom in or zoom out based on the first and second patterns predetermined in the display apparatus 100 will be described in detail.

Figure 3:
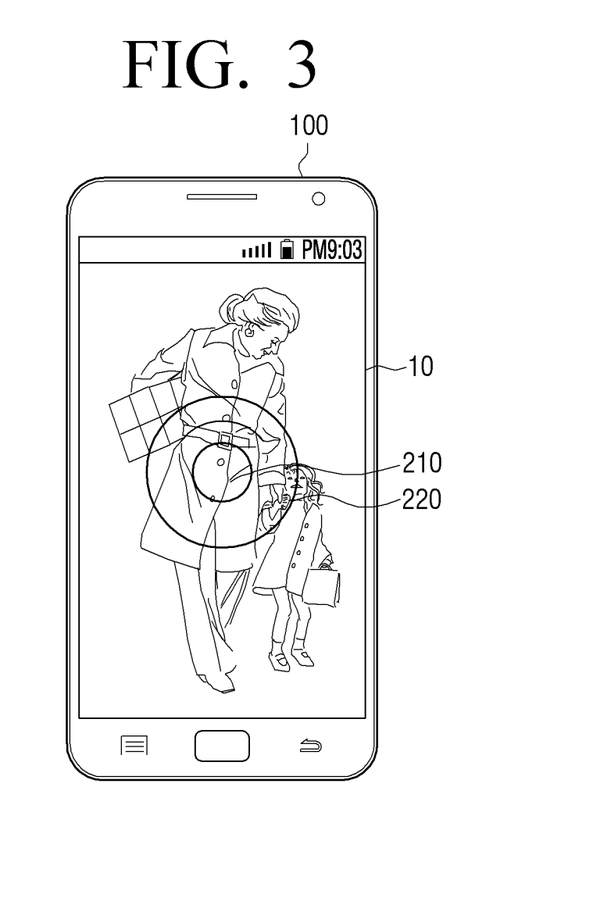
FIG. 3 is an exemplary view of a display apparatus that performs a zoom in according to an exemplary embodiment.
Figure 4:
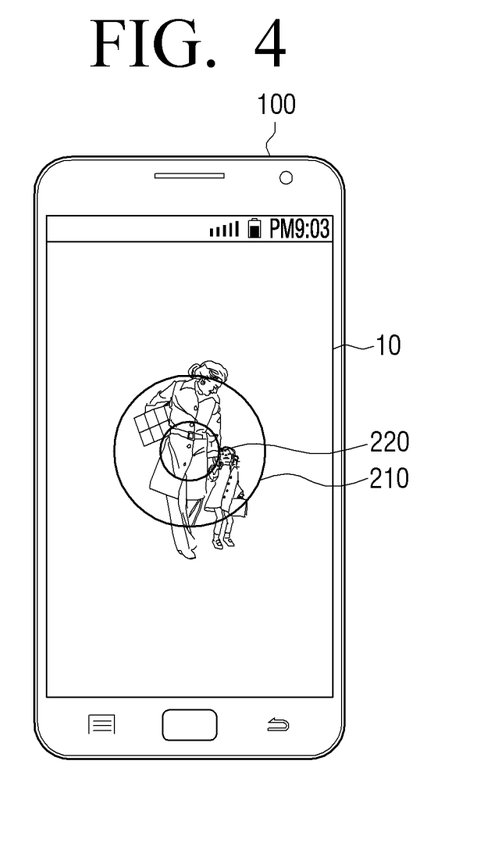
FIG. 4 is an exemplary view of a display apparatus that performs a zoom out according to an exemplary embodiment.

FIG. 3 is an exemplary view of a display apparatus that performs a zoom in according to an exemplary embodiment, and FIG. 4 is an exemplary view of a display apparatus that performs a zoom out according to an exemplary embodiment.

If the first and second patterns 210 and 220 are determined, the display apparatus 100 may compare the sizes of the first pattern 210 and the second pattern 220 with each other, and perform the zoom in or zoom out of the image 10 that is displayed on the screen according to the result of the comparison. Specifically, as illustrated in FIG. 3, the first pattern 210 that is formed according to the user's touch input may be positioned in an inner area of the second pattern 220 formed according to the user's touch input. In this case, the display apparatus 100 determines that the size of the second pattern 220 is larger than the size of the first pattern 210, and performs a zoom in of the image 10 that is displayed on the display screen. Accordingly, the image 10 that is displayed on the screen of the display apparatus 100 may be enlarged from the size as illustrated in FIG. 2 to the size as illustrated in FIG. 3 and the enlarged image 10 may be displayed.

On the other hand, as illustrated in FIG. 4, the first pattern 210 that is formed according to the user's touch input may be positioned in an outer area of the second pattern 220 formed according to the user's touch input. In this case, the display apparatus 100 determines that the size of the second pattern 220 is smaller than the size of the first pattern 210, and performs a zoom out of the image 10 that is displayed on the display screen. Accordingly, the image 10 that is displayed on the screen of the display apparatus 100 may be reduced from the size as illustrated in FIG. 2 to the size as illustrated in FIG. 4 and the reduced image 10 may be displayed.

If the zoom out is performed in a state where the image 10 displayed on the screen of the display apparatus 100 is enlarged to the size as illustrated in FIG. 3, the image 10 that is displayed on the screen of the display apparatus 100 returns to the initially set size as illustrated in FIG. 2, and is displayed with the initially set size.

On the other hand, according to an exemplary embodiment, if a touch input related to a third pattern in a straight line shape is consecutively performed after the touch input for the second pattern is performed, the controller 130 may differently perform the zoom in or zoom out of the content that is displayed on the display screen based on the direction of the third pattern.

Specifically, the sensor 120 determines whether the touch input related to the third pattern in the straight line shape is consecutively sensed after the touch input for the second pattern is performed. Here, it is preferable that the third pattern may be not only a pattern in the straight line shape but also a pattern in a curve shape. If it is determined that the touch related to the third pattern is consecutively sensed after the touch input for the second pattern is performed, the controller 130 may differently perform the zoom in or zoom out of the content that is displayed on the display screen based on the direction of the third pattern.

Specifically, if the direction of the third pattern is directed to an outside direction of the second pattern, the controller 130 performs the zoom in of the content that is displayed on the display screen. On the other hand, if the direction of the third pattern is directed to an inside direction of the second pattern, the controller 130 performs the zoom out of the content that is displayed on the display screen.

On the other hand, according to an exemplary embodiment, the controller 130 may move a content area that belongs to the first pattern to a direction that corresponds to the direction of the third pattern if the zoom in of the content that is displayed on the display screen is performed in accordance with the direction of the third pattern.

Hereinafter, referring to FIGS. 5 to 7, the operation of performing the zoom in or zoom out of the content that is displayed on the screen based on the first to third patterns will be described in detail.

Figure 5:
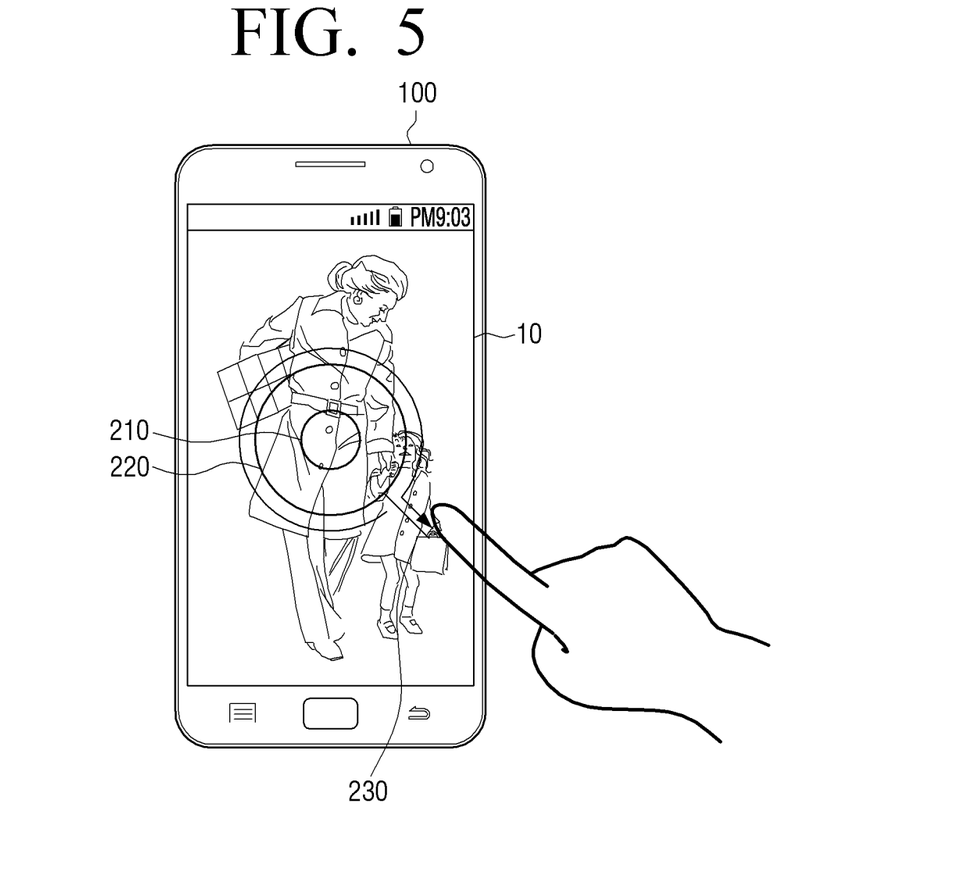
FIG. 5 is an exemplary view of a display apparatus that performs a zoom in based on first to third patterns according to an exemplary embodiment.
Figure 6:
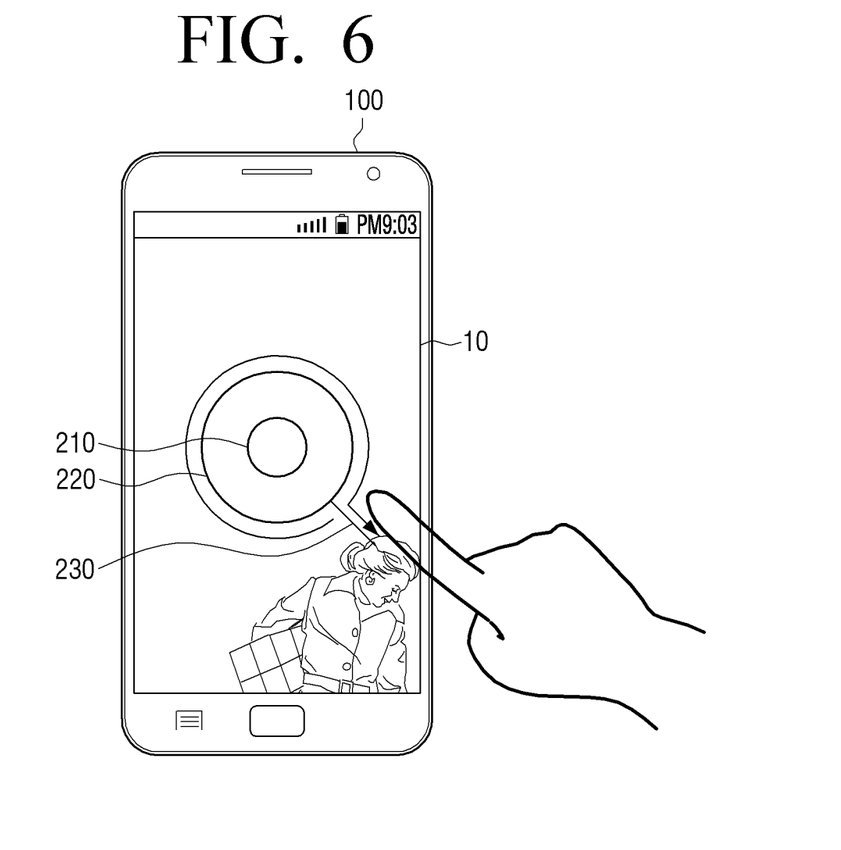
FIG. 6 is an exemplary view of a display apparatus that moves content zoomed in based on first to third patterns according to an exemplary embodiment.
Figure 7:
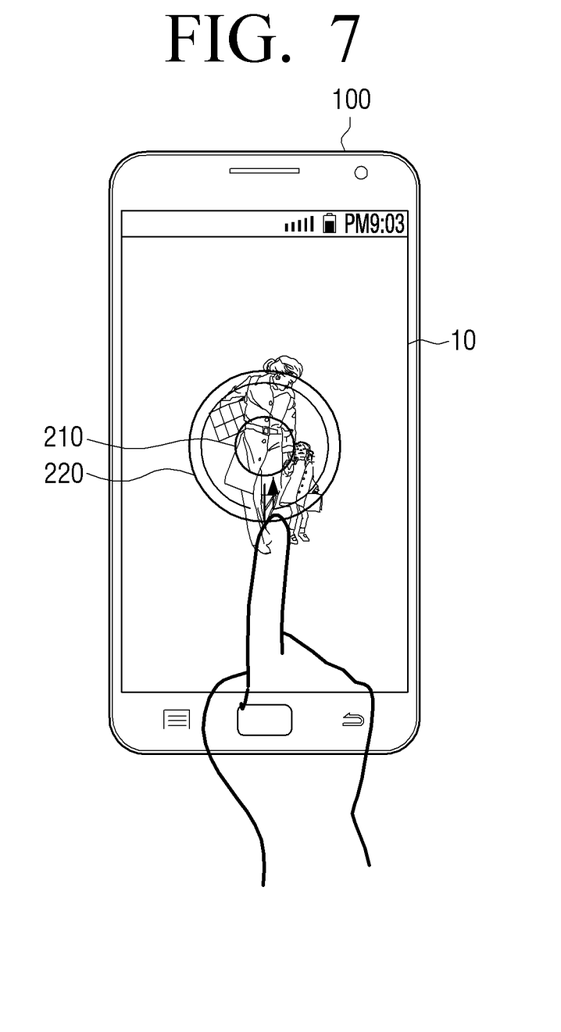
FIG. 7 is an exemplary view of a display apparatus that performs a zoom out based on first to third patterns according to an exemplary embodiment.

FIG. 5 is an exemplary view of a display apparatus that performs a zoom in based on the first to third patterns according to an exemplary embodiment, FIG. 6 is an exemplary view of a display apparatus that moves content zoomed in based on the direction of the third pattern according to an exemplary embodiment, and FIG. 7 is an exemplary view of a display apparatus that performs a zoom out based on the first to third patterns according to an exemplary embodiment.

As described above with reference to FIG. 2, an image 10 may be displayed on the screen of the display apparatus 100. In a state where such an image 10 is displayed, a user may consecutively perform a touch having a circular shape pattern using his/her finger or a touch pen. That is, the user may perform a touch that indicates the first pattern 210 of a circular shape, and then perform a touch that indicates the second pattern 220 of a circular shape within a predetermined threshold time. At this time, in performing the touch that indicates the first and second patterns 210 and 220, the user may select a touch movement direction as a left or right movement direction. On the other hand, as illustrated in FIG. 5, the user may perform the touch for the second pattern 220, and then may consecutively perform the touch that indicates the third pattern 230 in the straight line shape in the outside direction of the second pattern 220.

If it is determined that the direction of the third pattern 230 is directed to the outside direction of the second pattern 220, the display apparatus 100 performs zoom in of the image 10 that is displayed on the display screen. Accordingly, the image 10 that is displayed on the screen of the display apparatus 100 may be enlarged from the size as illustrated in FIG. 2 to the size as illustrated in FIG. 3 and the enlarged image 10 may be displayed. On the other hand, the display apparatus 100 may enlarge the size of the image 10 that is displayed on the screen in stages according to the length of the third pattern 230.

On the other hand, the display apparatus 100 may move and display the enlarged image 10 according to a zoom in command.

As illustrated in FIG. 6, if the direction of the third pattern 230 in the straight line shape formed along the consecutive touch input is directed to the 5 o'clock direction after the touch input for the second pattern 220 is performed, the display apparatus 100 moves the enlarged image 10 as shown in FIG. 5 to the lower right end of the screen according to the direction of the third pattern 230. Accordingly, the enlarged image 10 that is displayed on the screen of the display apparatus 100 may move to the lower right end to be displayed. At this time, the display apparatus 100 may move the enlarged image 10 in stages according to the length of the third pattern 230.

On the other hand, as illustrate in FIG. 7, the direction of the third pattern 230 may be directed to the inside direction of the second pattern 220. In this case, the display apparatus 100 performs the zoom out of the image 10 that is displayed on the display screen. Accordingly, the image 10 that is displayed on the screen of the display apparatus 100 may be reduced from the size as illustrated in FIG. 2 to the size as illustrated in FIG. 7 and the reduced image 10 may be displayed. At this time, the display apparatus 100 may reduce the size of the image 10 in stages according to the length of the third pattern 230.

Up to now, the operation of performing zoom in or zoom out according to the user's touch input in the display apparatus 100 according to exemplary embodiments has been described in detail. Hereinafter, a method for controlling the zoom in or zoom out according to the user's touch input in the display apparatus 100 according to an exemplary embodiment will be described in detail.

Figure 8:
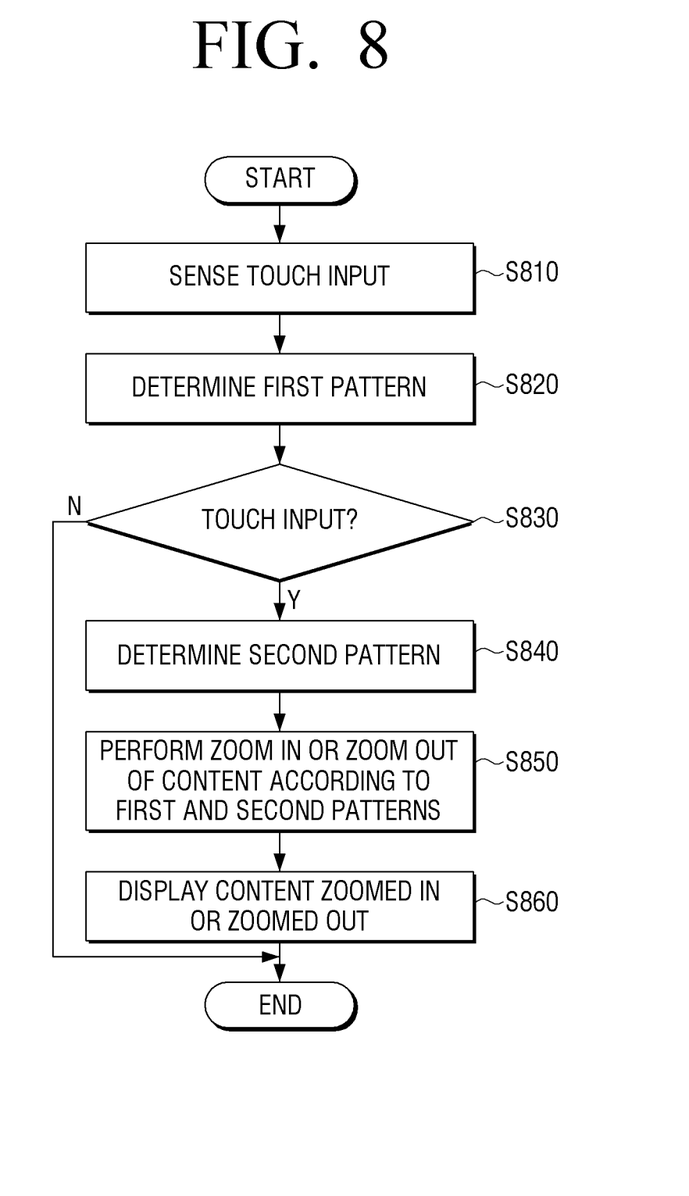
FIG. 8 is a flowchart of a method for controlling a display apparatus according to an exemplary embodiment.

FIG. 8 is a flow chart of a method for controlling a display apparatus according to an exemplary embodiment.

As illustrated in FIG. 8, the display apparatus 100 senses a touch input on the display screen (Operation S810). If the touch input is sensed, the display apparatus 100 determines the first pattern based on the sensed touch input (Operation S820). Thereafter, the display apparatus 100 determines whether a touch input is sensed within a predetermined threshold time (Operation S830). If the user's touch input is sensed within the predetermined threshold time after the first pattern is determined as the result of the determination, the display apparatus 100 determines the second pattern based on the touch input sensed within the predetermined threshold time (Operation S840). Thereafter, the display apparatus 100 determines whether a touch input related to the third pattern in the straight line shape is consecutively sensed after the touch input for the second pattern is performed (Operation S850). If it is determined that the touch input related to the third pattern is not consecutively sensed as the result of the determination, the display apparatus 100 performs zoom in or zoom out of the content that is displayed on the display screen based on the predetermined first and second patterns (Operation S860). Thereafter, the display apparatus 100 displays the content zoomed in or zoomed out (Operation S870).

Specifically, if the first pattern and the second pattern are determined, the display apparatus 100 determines whether the first and second patterns are patterns in the same figure shape. If the first and second patterns are patterns in different figure shapes as the result of the determination, the display apparatus 100 does not perform the zoom in or zoom out of the content that is displayed on the display screen. On the other hand, if it is determined that the first and second patterns are the patterns having the same figure shape, the display apparatus 100 may compare the sizes of the first and second patterns with each other based on the number of points constituting the first pattern and the number of points constituting the second pattern. Thereafter, the display apparatus 100 performs the zoom in or zoom out of the content that is displayed on the display screen according to the result of comparison of the sizes of the first and second patterns.

According to an exemplary embodiment, if the size of the second pattern is larger than the size of the first pattern, the display apparatus 100 performs zoom in of the content that is displayed on the display screen. On the other hand, if the size of the second pattern is smaller than the size of the first pattern, the display apparatus 100 performs zoom out of the content that is displayed on the display screen.

On the other hand, according to an exemplary embodiment, the display apparatus 100 may perform the zoom in or zoom out of the content in stages according to the ratio of the number of points constituting the first pattern to the number of points constituting the second pattern.

On the other hand, according to an exemplary embodiment, when performing the zoom in of the content, the display apparatus 100 may move the content area that belongs to the first pattern to the center area of the display screen. For example, if it is sensed that the touch input for the first pattern having a size that is smaller than the size of the second pattern is performed at an upper left end of the display screen, the display apparatus 100 moves the content area that is displayed at the upper left end of the display screen before the zoom in to the center area of the display screen to display the content area on the center area of the display screen. Accordingly, the content area, which is displayed at the upper left end of the display screen before the zoom in, is moved to the center area of the display screen to be displayed thereon.

On the other hand, if it is determined that the touch input related to the third pattern in the straight line shape is consecutively sensed after the touch input for the second pattern is performed, the display apparatus 100 performs zoom in or zoom out of the content that is displayed on the display screen based on the direction of the third pattern.

Specifically, if the third pattern direction is directed to the outside direction of the second pattern, the display apparatus 100 performs the zoom in of the content that is displayed on the display screen. At this time, the display apparatus 100 may move the content area that belongs to the first pattern to a direction that corresponds to the direction of the third pattern when the zoom in of the content is performed along the direction of the third pattern. On the other hand, if the direction of the third pattern is directed to the inside direction of the second pattern, the zoom out of the content that is displayed on the display screen is performed. As described above, the display apparatus 100 according to an exemplary embodiment may enlarge or reduce the size of the content that is displayed on the display screen through performing of zoom in or zoom out in accordance with the direction of the third pattern that is determined according to the consecutive touch input after the touch input for the second pattern is performed.

While the exemplary embodiments have been shown and described with reference to the drawings, it will be understood by those skilled in the art that various changes in form and detail may be made therein without departing from the spirit and scope of the inventive concept, as defined by the appended claims.

What is claimed is:

1. A method for controlling a display apparatus, comprising:
    sensing a first touch input on a display screen;
    determining a first pattern based on the sensed first touch input;
    determining a second pattern based on a second touch if the second touch input is sensed in a predetermined threshold time after the first pattern is determined;
    performing a zoom in or a zoom out of content that is displayed on the display screen based on the first and second patterns; and
    displaying the content that is zoomed in or zoomed out according to the performing.

2. The method for controlling a display apparatus as claimed in claim 1, wherein the performing of the zoom in or the zoom out comprises:
    comparing a size of the first pattern and a size of the second pattern with each other based on a number of points constituting the first pattern and a number of points constituting the second pattern; and
    performing the zoom in or the zoom out of the content that is displayed on the display screen in accordance with a result of the comparison.

3. The method for controlling a display apparatus as claimed in claim 2, wherein the performing of the zoom in or the zoom out further comprises:
    performing the zoom in of the content that is displayed on the display screen if the size of the second pattern is larger than the size of the first pattern; and
    performing the zoom out of the content that is displayed on the display screen if the size of the second pattern is smaller than the size of the first pattern.

4. The method for controlling a display apparatus as claimed in claim 3, wherein the performing of the zoom in or the zoom out comprises performing the zoom in or the zoom out of the content in stages in accordance with a ratio of the number of points constituting the first pattern to the number of points constituting the second pattern.

5. The method for controlling a display apparatus as claimed in claim 2, wherein the performing of the zoom in or the zoom out comprises moving a content area that belongs to the first pattern to a center area of the display screen if the zoom in of the content is performed.

6. The method for controlling a display apparatus as claimed in claim 1, further comprising determining whether a third touch input related to a third pattern that is in a form of a straight line is consecutively sensed after the second touch input is performed,
    wherein the performing of the zoom in or the zoom out includes differently performing the zoom in or the zoom out of the content that is displayed on the display screen based on a direction of the third pattern.

7. The method for controlling a display apparatus as claimed in claim 6, wherein the performing of the zoom in or the zoom out comprises:
    performing the zoom in of the content that is displayed on the display screen if the direction of the third pattern is directed to an outside direction of the second pattern and
    performing the zoom out of the content that is displayed on the display screen if the direction of the third pattern is directed to an inside direction of the second pattern.

8. The method for controlling a display apparatus as claimed in claim 7, wherein the performing of the zoom in or the zoom out comprises if the zoom in of the content is performed in accordance with the direction of the third pattern, moving a content area that belongs to the first pattern to a direction that corresponds to the direction of the third pattern.

9. The method for controlling a display apparatus as claimed in claim 1, wherein the first and second patterns comprise a figure shape, and
    the method further comprises determining whether the first and second patterns are patterns in the same figure shape.

10. A display apparatus comprising:
    a display configured to display content;
    a sensor configured to sense touch input on a display screen; and
    a controller configured to determine a first pattern based on a first sensed touch input, to determine a second pattern based on a second touch input if the second touch input is sensed in a predetermined threshold time after the first pattern is determined, to control the display to perform a zoom in or a zoom out of the content based on the first and second patterns, and to display the content that is zoomed in or zoomed out based on the first and second patterns.

11. The display apparatus as claimed in claim 10, wherein the controller compares a size of the first pattern and a size of the second pattern with each other based on a number of points constituting the first pattern and a number of points constituting the second pattern, and performs the zoom in or the zoom out of the content that is displayed on the display screen in accordance with a result of the comparison.

12. The display apparatus as claimed in claim 11, wherein the controller performs the zoom in of the content that is displayed on the display screen if the size of the second pattern is larger than the size of the first pattern, and performs the zoom out of the content that is displayed on the display screen if the size of the second pattern is smaller than the size of the first pattern.

13. The display apparatus as claimed in claim 12, wherein the controller performs the zoom in or the zoom out of the content in stages in accordance with a ratio of the number of points constituting the first pattern to the number of points constituting the second pattern.

14. The display apparatus as claimed in claim 11, wherein the controller moves a content area that belongs to the first pattern to a center area of the display screen if the zoom in of the content is performed.

15. The display apparatus as claimed in claim 10, wherein the controller differently performs the zoom in or the zoom out of the content that is displayed on the display screen based on a direction of a third pattern if a third touch input related to the third pattern that is in a form of a straight line is consecutively sensed after the second touch input is performed.

16. The display apparatus as claimed in claim 15, wherein the controller performs the zoom in of the content that is displayed on the display screen if the direction of the third pattern is directed to an outside direction of the second pattern, and performs the zoom out of the content that is displayed on the display screen if the direction of the third pattern is directed to an inside direction of the second pattern.

17. The display apparatus as claimed in claim 16, wherein the controller moves a content area that belongs to the first pattern to a direction that corresponds to the direction of the third pattern if the zoom in of the content is performed in accordance with the direction of the third pattern.

18. The display apparatus as claimed in claim 10, wherein the first and second patterns comprise a figure shape, and the controller determines whether to perform the zoom in or the zoom out based on whether the first and second patterns are patterns in the same figure shape.

19. A method for controlling a display apparatus, comprising:

displaying content on a display screen;

sensing a first touch input on the display screen;

sensing a second touch input on the display screen that is input within a predetermined time of the first touch input;

determining a first pattern of the first touch input and a second pattern of the second touch input; and zooming in or zooming out of the content that is displayed on the display screen based on the first pattern and the second pattern.

20. The method for controlling a display apparatus as claimed in claim 19, wherein the zooming in or zooming out comprises:

comparing a size of the first pattern with a size of the second pattern based on a number of points constituting the first pattern and a number of points constituting the second pattern; and zooming in or zooming out of the displayed content based on the comparing.

* * * * *